United States Patent [19]

Weckenmann et al.

[11] 4,164,730
[45] Aug. 14, 1979

[54] EXTERNALLY CONTROLLABLE BINARY INTERROGATION AND DECODING CIRCUIT, PARTICULARLY FOR A REMOTE CONTROL LOAD SELECTION SYSTEM

[75] Inventors: Albert Weckenmann, Ahrensburg; Georg Haubner, Berg, both of Fed. Rep. of Germany

[73] Assignee: Robert Bosch GmbH, Stuttgart, Fed. Rep. of Germany

[21] Appl. No.: 862,440

[22] Filed: Dec. 20, 1977

[30] Foreign Application Priority Data

Dec. 24, 1976 [DE] Fed. Rep. of Germany ....... 2658753

[51] Int. Cl.$^2$ ............................................ H04Q 11/04
[52] U.S. Cl. ......................... 340/168 R; 340/147 SY; 340/52 F; 307/10 R
[58] Field of Search ......... 340/168 R, 168 B, 147 SY, 340/167 R, 163, 52 F; 307/10 R

[56] References Cited

U.S. PATENT DOCUMENTS

| | | | |
|---|---|---|---|
| 3,544,803 | 12/1970 | Taylor | 307/10 R |
| 3,828,313 | 8/1974 | Schull et al. | 340/147 SY |
| 3,864,578 | 2/1975 | Lackey | 340/52 F |
| 4,085,403 | 4/1978 | Meier et al. | 340/147 SY |

Primary Examiner—Donald J. Yusko
Attorney, Agent, or Firm—Frishauf, Holtz, Goodman & Woodward

[57] ABSTRACT

To permit external programming of the decoding of outputs from a binary counter, a polarized power supply is connected, selectively, through a plurality of control gates to the counter, the control gates having transfer switch characteristics and, in dependence on their connection to the specific polarity of the power supply, provide decoded outputs representative of specific count states of the counter to enable further AND-function gates in accordance with the decoded outputs and thereby permit selection of selected loads if other inputs to the AND-function gates are also enabled.

23 Claims, 9 Drawing Figures

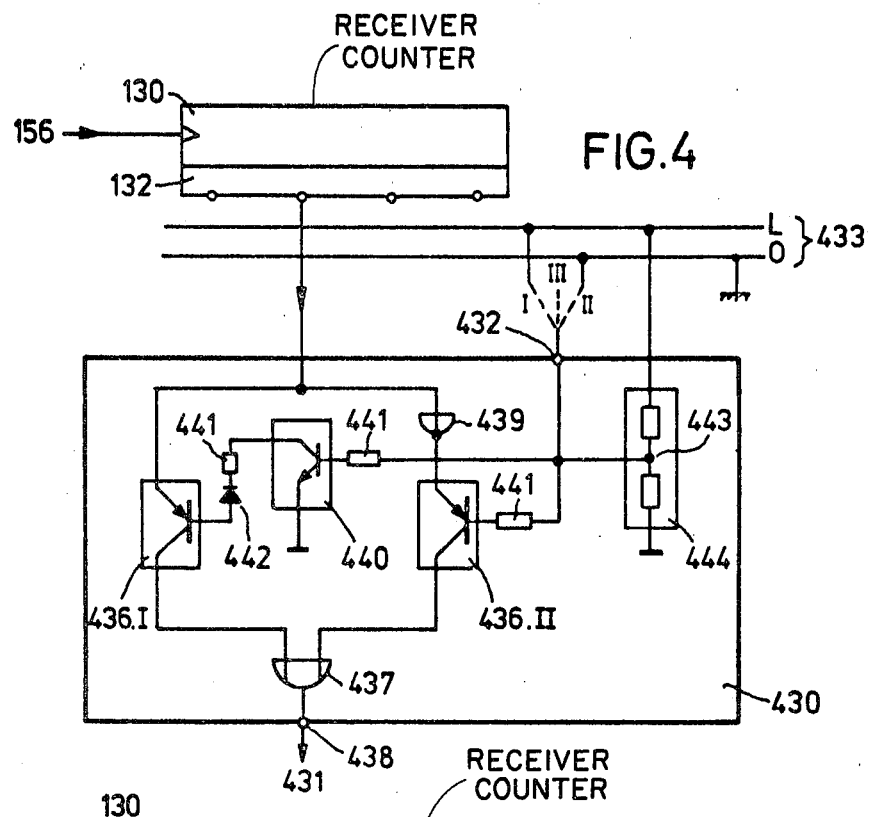
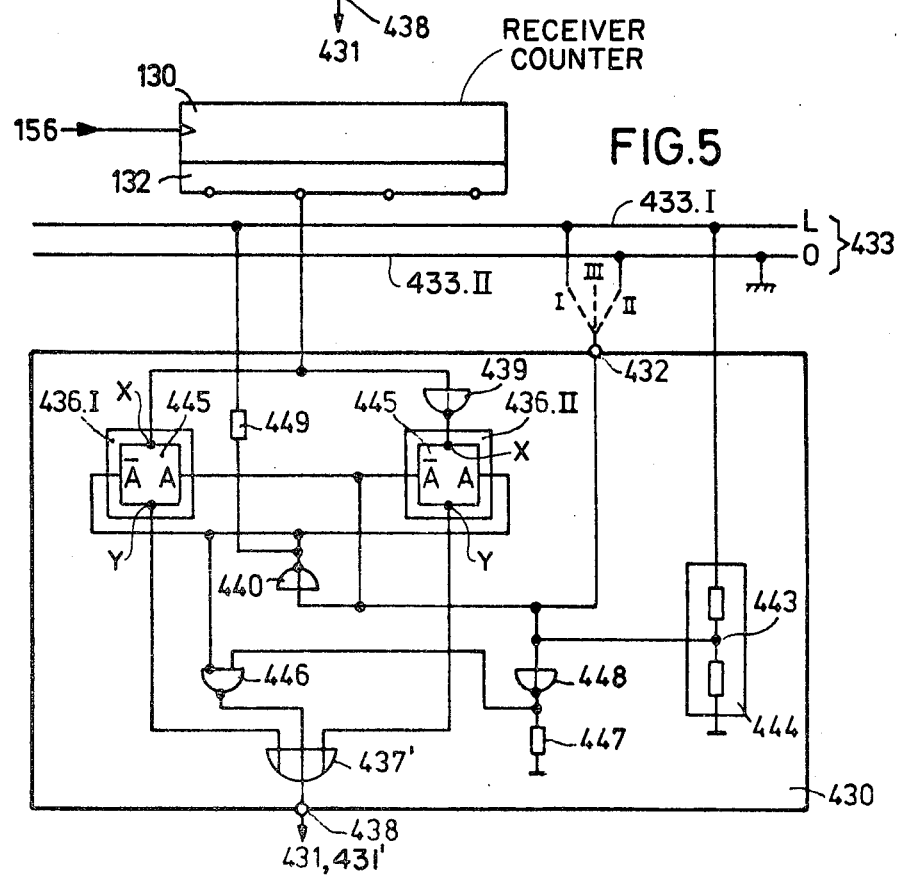

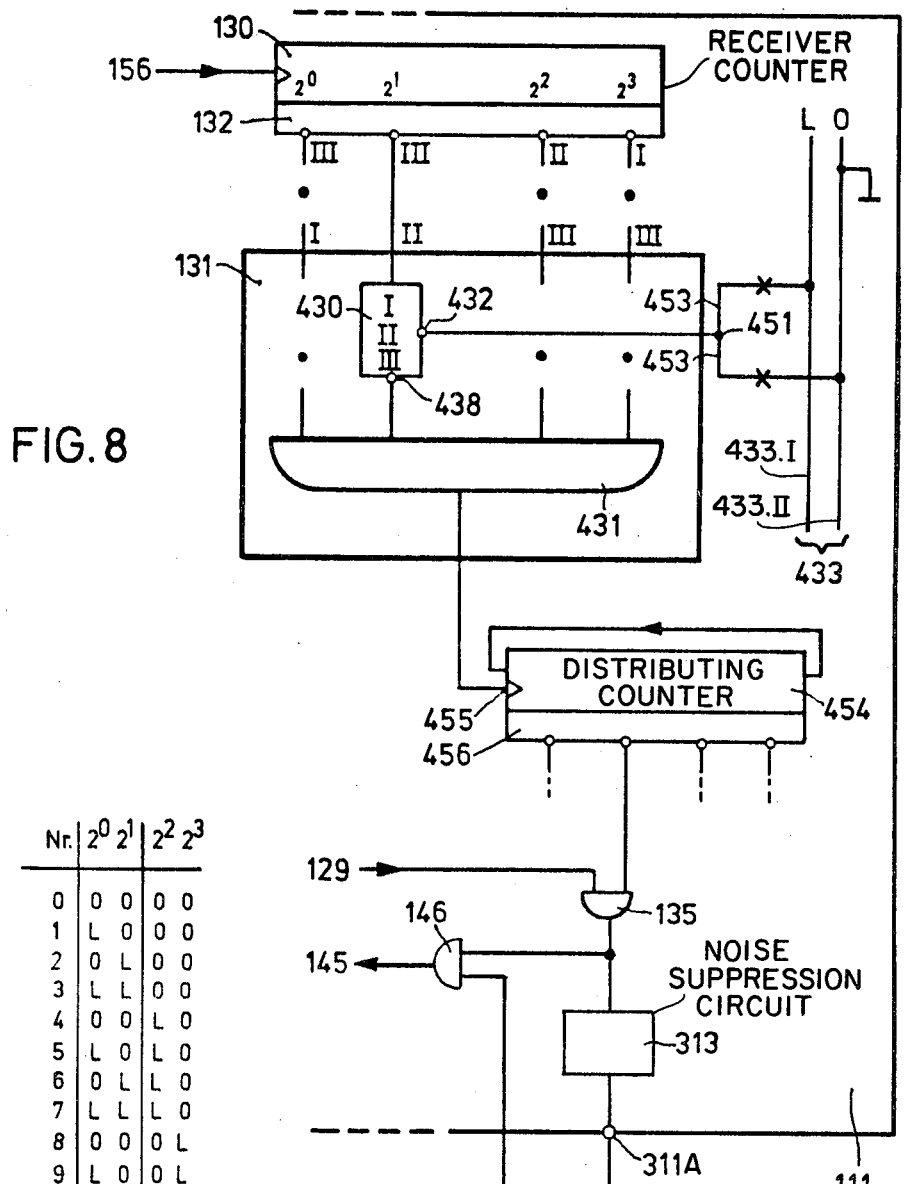

EXTERNALLY CONTROLLABLE BINARY INTERROGATION AND DECODING CIRCUIT, PARTICULARLY FOR A REMOTE CONTROL LOAD SELECTION SYSTEM

Cross reference to related applications and patent, assigned to the assignee of the present application, the disclosure of which is hereby incorporated by reference:

U.S. Ser. No. 648,783, filed Jan. 13, 1976, Meier et al, now U.S. Pat. No. 4,085,403, Meier et al;
U.S. Ser. No. 835,180, filed Sept. 20, 1977, Weckenmann et al;
U.S. Ser. No. 836,979, filed Sept. 26, 1977, Weckenmann et al;
U.S. Ser. No. 840,487, filed Oct. 7, 1977, Wesemeyer et al.

The present invention relates to a decoding circuit for interrogation of the binary switching states or count states of a counter, and more specifically to permit interrogation of the count states of a counter for use in a remote load control system.

BACKGROUND AND PRIOR ART

U.S. Pat. No. 4,085,403, Meier et al, discloses a remote control system in which, selectively, receivers are controlled under command from a central station. To effect the control, the central station has a counter which counts in synchronism with clock pulses transmitted by the central station over a ring bus system. The receivers also have counters which count in the same synchronism, under control of the clock pulses. Specific receivers are enabled are remotely controlled by providing an additional control bus in the ring bus system which provides a pulse synchronously with a specific count state of the transmitter and, hence, also of the specific receiver. Upon coincidence of the count state of the counter associated with the specific receiver, and the count state of the transmitter counter, a coincidence gate is enabled which then provides a control signal to connect the respective load, associated with the receiver. The system is explained in detail in the aforementioned patent, the disclosure of which is incorporated by reference.

To program a receiver, as described in the aforementioned patent, it is necessary to provide suitably programmed logic interrogation gates connected to the receiver counter. The interrogation gates must be so arranged that they respond only when a certain count state is reached by the counter. The counter itself recycles, in sequences which are termed "selection cycles". When, within a selection cycle, an output signal appears at the respective interrogation gate, a suitable coincidence gate then is enabled to permit connection of the load.

To program specific loads, it is necessary to connect specifically programmed interrogation stages with the counter, each interrogation stage being associated with a predetermined load. This places substantial skill requirements on personnel installing, maintaining or replacing elements used in the overall system.

THE INVENTION

It is an object to provide a decoding circuit which simplifies the coding of the receiver by associating the receiver with specific count states of the receiver counter, without interfering in the circuit connections of the receiver itself and which, additionally, preferably is so arranged that a single stock element can be prepared, for example for replacement or repair purposes, to be selectively coded even by semi-skilled and unskilled personnel if a receiver elements has to be replaced.

Briefly, to provide an output which can be processed by a coincidence gate, that is, an output of a certain polarity or sign at a specific count state, each one of the count outputs of the receiver counter is connected to control gates having the function of a transfer switch, and connected to two terminals of respectively different polarities of a source of power. Dependent on the connection of the specific transfer switch to the respective polarity terminal of the power source, and depending on the count state of the counter, an output will be obtained from the gates which, either directly or inverted, can be transmitted to a coincidence gate. By selective connection of the control gates to the respective polarity terminals of the source of electrical power, any count state can be decoded externally by applying, either a 1-signal potential or a 0-signal potential to the gates, at all times, and fixed. The gates are so arranged that, for example, when a 1-signal also appears at the coordinate count state, the subsequent coincidence gate will be commanded with a 1-signal. Of course, alternatively, control of the coincidence gate with a 1-signal can also be obtained by inversion, that is, if the associated count output stage to which the control gate is connected has a 0-signal applied thereto.

The association of a predetermined count state in accordance with a certain combination of the binary output signals at the receiver counter thus can be programmed externally without interfering in the circuit connections between the receiver counter on the one hand, and the subsequent logic circuits on the other. Rather, it is only necessry to apply the potentials of proper polarity to the gates.

The system is particularly suitable as a remote control system to connect, selectively, various loads in a motor vehicle. Programming of the receivers associated with respective loads is one of the more difficult operations, and one of the sources of errors. Unskilled intrusion into the logic circuit, or intervention in its logic connection is eliminated by external programming. Additionally, the coding applied to a certain receiver can be readily checked or monitored, since it is no longer necessary to change wiring within a circuit itself but merely the static application of 1-signals or 0-signal to the control gates.

The systems lends itself readily for construction as integrated circuits. It is also possible to use separate inverter stages associated with one of the two switching positions of the control gates. Suitable elements are transmission gates of the COS-MOS type.

It has previously been proposed—see cross-referenced incorporated application Ser. No. 836,979, filed Sept. 26, 1977, Weckenmann et al, to control certain receivers, a plurality of time during each selection cycle, so that each receiver will have a plurality of count positions associated therewith. This permits transmission of sensed information to the central station, the sensed information being transmitted digitally in the form of binary words, during any one selection cycle, for example over a reply line forming part of the ring bus system. Use of a binary coded receiver counter permits multiple response of the receiver within a single selection cycle by interrogating the lower-valued count outputs after a particular logical constellation has been obtained; the not interrogated count outputs will have a potential applied thereto which, for example, constantly simulates a 1-signal. This simulation can be carried out by means of exclusive OR-gates by applying a 1-signal to the output of the exclusive OR-gate at all times, thereby simulating a continuous 1-signal at the count stages of the counter. Suitable decoupling networks may be required between the exclusive OR-gates, as well known.

In accordance with a feature of the invention, it is simpler, and more reliable, particularly in view of possible programming of a receiver by unskilled or semi-skilled personnel, to so construct the control gates having the transfer characteristic that they have three switching positions, that is, one switching position connected to a source of potential of one polarity providing, for example, the 1-signal; another connection to a source of potential at the other polarity, providing the 0-signal; and a third connection in which neither the 1-signal nor the 0-signal is connected, that is, the switch is entirely open-circulated. The gate is so constructed that it still derives power from the system and, if both terminals are unconnected, it provides an output signal which, independently of input information applied to the control gate from the counter states, provides an output of a predetermined value, for example a 1-signal, thus simulating a continuous 1-signal from the counter.

The simulation of the 1-signal can be obtained by including a voltage divider in the system providing, for example, about half of the normal operating voltage so that, if the input in the third position is neither connected to the source of 1-signal nor to the source of 0-signal, that is, is left open, an intermediate voltage will arise within the gate circuitry itself which is sufficient, however, to so bias the elements within the gates that the output will provide a 1-signal at all times regardless of the nature of the input thereof.

Preferably, the circuit structure itself is made as an integrated circuit, or as a potted, entirely enclosed circuit, with terminals brought out for selective connections to external voltage supplies, the connections being formed by conductive bridges which can be selectively punched out, cut out, or otherwise broken, so that only the terminal of the selected polarity is connected to the respective terminals of the integrated circuit or potted circuit. Thus, stocking of different types of receivers becomes unnecessary since the programming of the receiver can readily be carried out in the field from one element which is universally adaptable.

Drawings, illustrating an example:

FIG. 4 is a detailed circuit diagram of the basic circuit of FIG. 3, expanded by illustrating the connection of the system for use with a third position;

FIG. 5 is a diagram functionally equivalent to FIG. 4, but using transmission gates;

FIG. 8 illustrates the connection of any one of the control gates of FIGS. 3 to 7 in combination with a plurality of sub-receivers associated with a single receiver code; and FIG. 9 is a truth table of the system of FIG. 8.

Figure 1:
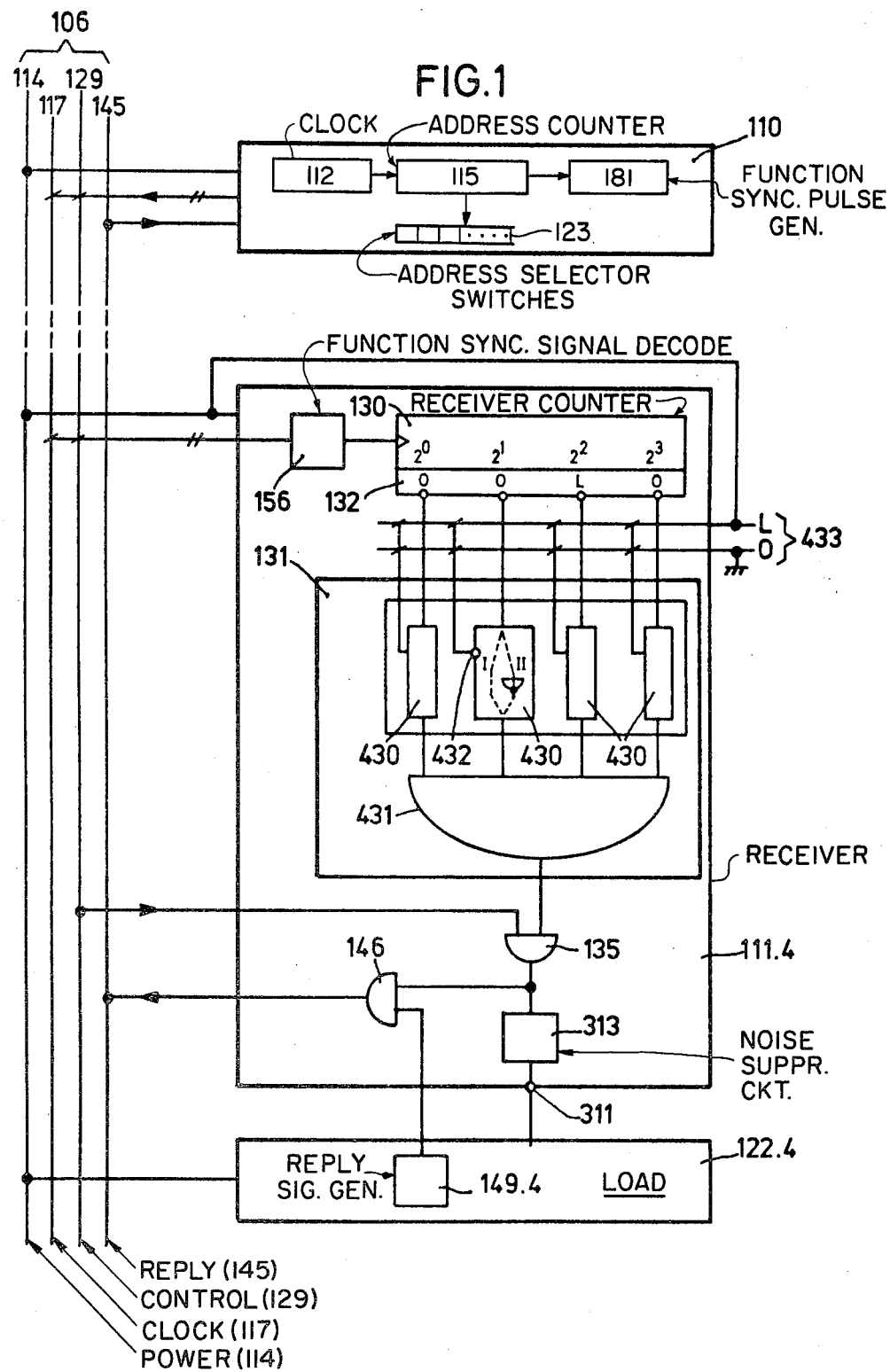
FIG. 1 is a highly schematic general circuit diagram of a system having a central station and a voltage polarity programmable receiver to control a specific load connected to the receiver, and showing those elements, in detail, which differ from the general receiver elements shown in the aforementioned patent to Meier et al.

A ring bus system 106 (FIG. 1) is connected to a central station 110 which has a clock source 112, an address counter 115, a function synchronization pulse generator 181, and a plurality of address selector switches, the address selector switches selectively connecting count stages of the address counter 115 to the control bus 129 of the ring bus system. The function synchronization pulse generator 181 separates application of clock pulses between the clock bus and the control bus, clock pulses appearing on the clock bus defining a selection cycle, and clock pulses appearing on the control bus at times when there are no clock pulses on the clock bus, defining a synchronization interval, or synchronization pulse. The ring bus system 106 also includes a power bus 114, supplying operating power to the system as well as to the load, and a reply bus 145 on which information appears that commanded control or switching functions have been carried out. The reference numbers used herein identical to those of the aforementioned Meier patent describe the same elements therein.

As far as the logic circuits are concerned, the power bus 114 carries a 1-voltage, shown on the drawings as a L level. The 0 level, for actual wiring use, means a connection to a reference bus which, in an automotive vehicle, would be chassis or, in other installations, usually ground. When used in a motor vehicle, the power bus 114 carries positive battery voltage. To simplify the diagram, systems and devices to stabilize the voltage, and to suppress interference signals have been omitted. Positive logic is used in the digital elements incorporated in the system. The invention, of course, is not limited to such logic, nor to the specifically described components and features since various types of logic components and logic systems can be employed.

The clock bus 117 provides clock pulses from clock 112 to all the receivers 111 connected to the ring bus system, only one receiver 111.4, and being the fourth one in the connection sequence, is shown. All the receivers include a receiver counter 130 which, after the function synchronization signal has been decoded in a decoding circuit 156, is stepped in synchronism with the clock pulses on clock bus 117 while a selection cycle is progressing. Complete counting of the receiver counter 130 in any one of the receivers, therefore, corresponds to counting through a complete cycle of the address counter 115 in the central station 110. To synchronize the counting of the address counter 115 and the receiver counter 130, and to separate the selection cycles, a function synchronization signal is transmitted over the control bus 129, decoded in the function synchronization signal decode element 156 to reset the respective receiver counters 130 to their initial state. For a complete description of this system, reference is made to copending incorporated application Ser. No. 835,180, filed Sept. 20, 1977, Weckenmann et al.

If a substantial number of receivers 111 is connected to the ring bus system, then it is of advantage to construct the counters, and particularly the receiver counters 130 in the receivers as binary counters, as explained in the aforementioned Meier patent with reference to FIG. 5 thereof, rather than as shift registers. Consequently, count states must be decoded so that the switching states associated with the respective stages of the binary counter can be suitably evaluated, with respect to the significance assigned to the output terminals 132 at any one receiver. A decoding circuit 131 is connected to all the outputs of the output circuit 132 connected to the receiver counter 130. The decoding circuit 131 provides an output signal if, and only if, the receiver counter 130 has reached that count number which is associated with the specific receiver 111, in the example shown the number 4, since the receiver shown is the receiver 11.4. In other words, in the connection shown, a coincidence circuit 431 is enabled when the counter has reached the binary count 4, as decoded by the decoding circuit 131. If, simultaneously with enabling of the coincidence gate 135, a pulse is also received on the control bus 129, output will be derived from the coincidence gate 135. A noise suppression circuit 313 is connected to the output of the gate 135, in the form of a counter, as explained in the aforementioned cross-referenced applications, to determine that the coincidence between the output from decoding stage 131 and the pulse on control bus 129 is not due to noise. If the noise suppression counter 313 has determined that the output from gate 135, indeed, is a commanded output, then an output signal is applied to output terminal 311 to control a specific load 122.4 associated with the receiver 111.4. The load 122.4 may be a load in the classical sense of the term, such as, for example, a blower motor, a headlight lamp, or the like; or, alternatively, it may be an operating element which can be a sensor such as, for example, a fuel gauge, or another sensor which forms part of the control circuit. A reply signal generator 149 is provided to sense response of the load 122.4 and to supply a reply signal on reply bus 145 of the ring bus system 106 to the central station 110. If the reply occurs at the proper time, in view of synchronization by the clock 112, and of AND-gate 146, reply information is transmitted to the central station 110 where it can be displayed, if desired. The reply coincidence gate 146, thus, is enabled only if, in the first place, the load is enabled and, additionally, the load has responded. The term "load" as used herein should not be deemed to be limited to a motor, illumination element or the like, but is deemed to include additionally any functional element which can be selectively controlled to respond upon application of suitable control and clock pulses to bus lines 117, 129 of the ring bus system 106.

The decoding circuit 131 includes therein electrically controllable gates 430 having the characteristics of transfer switches. One gate, each, is associated with any one of the output terminals of the output unit 132 connected to the receiver counter 130. The outputs of all the gates 430 are connected to an AND-gate 431. In order to interrogate, for example, the count number 4, with respect to the binary switching states of the outputs, as shown in FIG. 1, the programming of the receiver must be done in such a manner that only if the receiver counter 130 has counted 4, the AND-gate 431 will have 1-signals of all its input terminals during any one selection cycle. Programming of the receiver is obtained by selective control of the respective transfer gates 430 by satisfying the coincidence conditions for AND-gate 431 of the counter 130 has reached the count number 4.

The count output 132 which already carries a 1-signal need only be connected directly to the AND-gate 431, that is, the respective gate 430 need only be placed in the condition shown in broken lines I. The other count outputs from stage 132 must be connected through the gates 430 through inverters contained therein, that is, must have the transfer switch position II shown in broken line in one of the count elements 430, for illustration, and in symbolic form.

Programming of the receiver 111 with respect to a specific count state of the respective transfer gates 430 is obtained by means of control inputs 432 which are permanently connected, when incorporated in the system, either to have a 1-signal applied thereto or to have a 0-signal applied thereto, by suitable respective connection to a voltage supply bus system 433 having two buses 433.I and 433.II respresentative, respectively, of different polarity. Thus, the L bus 433.I of bus system 433 is connected to the power bus 114 or to a stabilized connection thereto; and the O bus 433.II is connected to ground, chassis, or reference.

Figure 2:
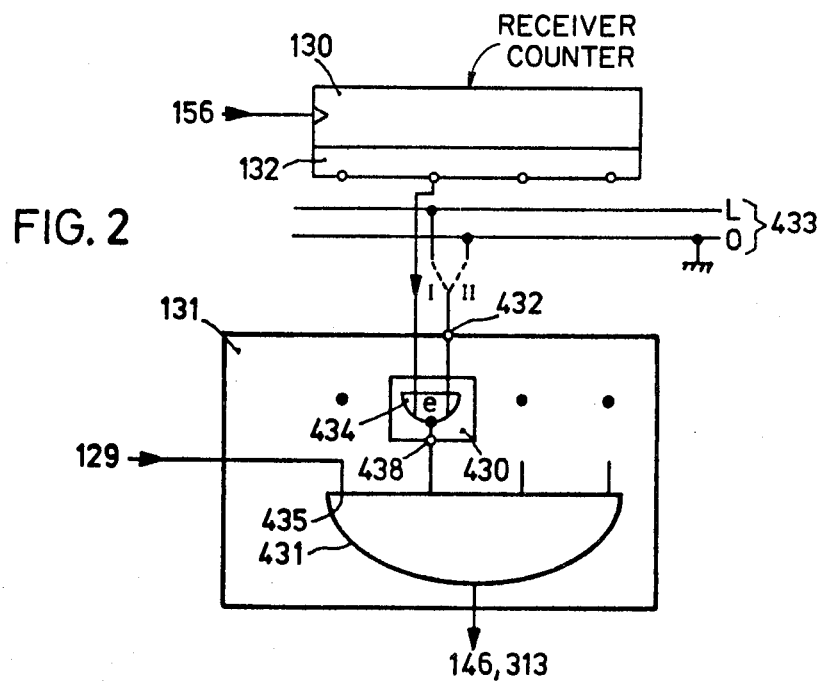
FIG. 2 is a fragmentary circuit diagram illustrating a modification of the coincidence gate connection.

The coincidence gate 135 and the AND-gate 431 can be combined in one single AND-function gate. FIG. 2 illustrates a particularly economical arrangement in which the transfer control gates 430 have their outputs connected to a single conjunctive gate 431', having AND-function. The transfer gates 430 are constructed as EXCLUSIVE-OR-gates 434 having an inverting output. The two inputs of the gates 434 are connected, respectively, to the signal input 432, identical to the inputs 432 shown in FIG. 1, and selectively connectable with either the 1-signal bus or the 0-signal bus of bus system 433. The second inputs of the gates 433 are connected to the associated count output position of the output stage 132 of the receiver counter 130. The inverting output of the exclusive OR-gate 434, connected to the output terminal 438 thereof, forms the output of the transfer switch 430. It will have a 1-signal if, either, both inputs have a 0-signal thereon or both inputs have a 1-signal thereon. FIG. 2 illustrates the case in which the AND-gate 431' interrogates 0-signal positions at the respective output from stage 132. Thus, the control signal input 132 is connected in accordance with the switching alternative II to the potential bus 433 which carries the 0-voltage. The input terminal 435 of the gate 431' is connected to the control bus 129 and corresponds to the respective input is connected to gate 135 in FIG. 1.

In some arrangements, and primarily to reduce costs, the separate coincidence stage 135 connected separately behind, or downstream of the decoding circuit 131, is combined with the AND-gate 431 (FIG. 1) to result in the structure of FIG. 2, so that the AND-gate 431' (FIG. 2) requires the additional coincidence input 135.

Figure 3:
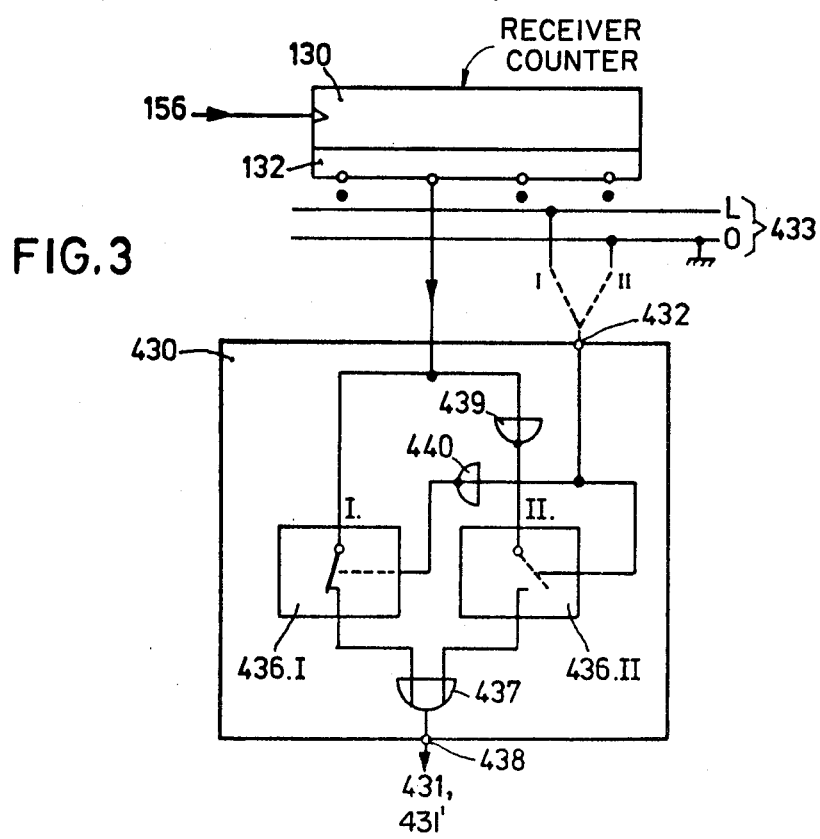
FIG. 3 is a fragmentary diagram illustrating a modification of the circuit of FIG. 2.

FIG. 3 illustrates a specific structure of the example shown in FIG. 2, and specifically the structure of an electrically controlled transfer gate 430 having transfer switching characteristics, assembled of two interconnected and electrically controllable switches 436.I and 436.II. To connect the first switching position, that is, switching position I (FIG. 1), a 1-signal is connected to the count output from the output stage 132 and directly applied to an OR-gate 437 and thus to the output terminal 438 of the circuit. In the switching position II, a 0-signal is connected from the output stage 132 over an inverter, constructed as a NOR-gate 439. The respective, mutually exclusive and alternative control of the switches 436.I/436.II is controlled over the same control signal input terminal 432, the first switch 436.I being connected through an inverter 440.

The basic block circuit diagram of FIG. 3 can be constructed in various structural ways. FIG. 4 illustrates switches 436.I/436.II in form of a transistor pair, inverter 440 also being constructed as a single-stage transistor circuit. FIG. 4 additionally shows the customary limit resistors 441 for base current and a diode 442 to provide for voltage matching between the switches 436.I and inverter 440 which controls switch 436.I.

FIG. 4 illustrates, additionally, an arrangement which permits transmission back to the central station of reply information on the reply bus 145 of the ring bus 106 which extends over a plurality of bits occurring during any one selection cycle. This is obtained by providing a third switching position for the transfer switch gate formed by the gates 430, in which the input 432 is connected to neither one of the 1-signal or the 0-signal buses of the bus system 433 but, rather, is left entirely blank or disconnected, corresponding, for example, to a central "OFF" position in a three-position switch.

The third switching state of the gate 430 is obtained by connecting the control signal input 432 additionally to a tap point 443 of a voltage divider 444 which has constant power or a 1-signal applied thereto. The voltage divider 444 is so dimensioned that the tap point 443 provides output voltage of about half the voltage between the 1-signal bus and the reference bus of the system 433, providing control voltage to the switch 430 at approximately half operating voltage. In the specific example, the voltage divider 444 provides such a voltage that the switch 436.II just has not yet blocked, and the transistor in inverter 444 is, however, already conductive, so that switch 436.I is also conductive. As a consequence, the output terminal 438 will have a 1-signal appear thereat, independently of the then existing instantaneous switching state at the count output at the receiver counter output stage 132.

The embodiment of FIG. 2 uses transistors to construct the control gate 430. FIG. 5 illustrates an arrangement in which the control gate 430 is built using COS-MOS transmission gates 445. Such transmission gates may, desirably, be units CD 4016, made by RCA. A detailed discussion of these gates is found in application notes available from RCA, for example application note ICAN-5593 (1967), ST 4001 (1969), ST 3973 (1969), ICAN-6176 (1970). Briefly, the COS-MOS transmission gates of the type CD 4016 includes self-blocking or enhancement-type field effect transistors (FET) which are non-conductive when the gate thereto is at zero volts. As symbolically shown in FIG. 5, A and $\bar{A}$ are complementary control inputs. If $A=1$ (or $\bar{A}=0$), the gate is blocked, meaning that the connection X-Y is open, or of high resistance. If $A=0$, or $\bar{A}=1$, the gate is conductive, that is, the connection X-Y is a low-resistance connection.

The transmission gates 445 are controlled in push-pull over their respective gate electrodes A, $\bar{A}$. To provide for push-pull control of the gates, they are connected, in inverse respective connection, and the control signal input 432 of the respective gate 430 is directly connected to one input, that is, to the gate electrode of the respective FET and through an inverter 440 to the other gate electrode of the respective other FET. To provide a continuous 1-signal at the output 438 if both input terminals I and II are disconnected from bus system 433, that is, to provide a continuous 1-signal when the switch is in the OPEN position or III, OR-gate 437' is constructed as a 3-input OR-gate. The third input has an inhibit gate 446 connected thereto, having an inverting output. The inverting input of the inhibit gate 446 is connected to the output of the inverter 440. The direct input of the inhibit gate 446 is connected over resistor 447 to reference potential on the one hand, that is, to the 0-level bus of the system 433 and, on the other, over an inverter 448 to the tap point 443 of the voltage divider 444 and, also, to the input terminal 432, as in FIG. 4.

Operation, circuit of FIG. 5: if the input 432 is not connected to either one of the buses of system 433, that is, if the input 432 is in the III position, then only the voltage taken off the tap point 443 of voltage divider 444 will become effective on the circuit. This voltage is so set that the input circuits of the inverter 440 and of the inverter 448 have not yet become conductive. Since the output of the inverter 440 is connected over resistor 449 to 1-signal voltage, the inverting input of the inhibit gate 446 will have a 1-signal appear thereat. The direct input of the inhibit gate 446, however, will have a 0-signal appear thereat, since the output of the inverter 448 is connected to zero or reference potential through resistor 447. Consequently, the output 438 will have a 1-signal appear thereon, independently of the nature or characteristic of the signal, that is, whether a 1-signal or a 0-signal associated with the respective count state of counter 430 and transmitted through the counter output stage 432.

Figure 6:
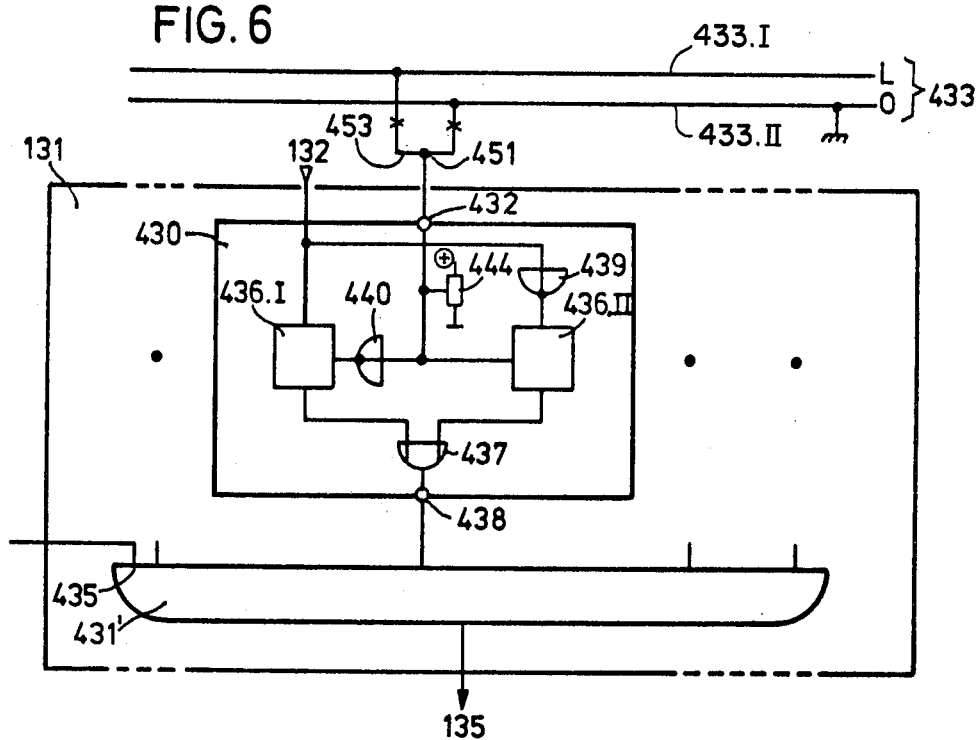
FIG. 6 is a basic block diagram illustrating the system and how it can be modified by selective interruption of connections of the system to signal sources of respectively differently polarity.

The gates 430 are preferably so constructed that, when first manufactured, they are unprogrammed and the control input 432 of any one gate 430 is connected to both the 1-signal bus and the 0-signal bus of the system 433. Then, and in accordance with the particular programming, selectively, either or both of the connections are severed. Severing can be done by punching out a connecting lead, scratching away a conductive path on a printed circuit board, clipping a conductor, or otherwise severing a conductive connection between terminal 432 and either one or both of the lines 433.I or 433.II (FIG. 6). If the receiver counter 130 is a four-stage binary counter, as illustrated in FIG. 1, and FIG. 6, the decoding circuit 131 requires four gates 430 between the AND-gate 431 (or 431') and the count output terminals of output stage 132 of the receiver 130. The individual transfer gate 430 requires interruption, then, of the connection between the 0-signal bus 433.II or interruption of the connection to the 1-signal bus 433.I in dependence upon whether a 1-signal is to be detected (switch position I in FIG. 3) or a 0-signal is to be detected and a 1-signal is to be transmitted to the AND-gate 431. If the particular count output of the counter is not to be interrogated at all, then a 1-signal should appear at the associated input of the AND-gate at all times. Under such condition, both previously provided connections to the input 432 are severed. By selective intrusion in one or both of the previously provided connections to the control input 432 of any one of the gates 430, any decoding function can readily be programmed in simple manner.

Figure 7:
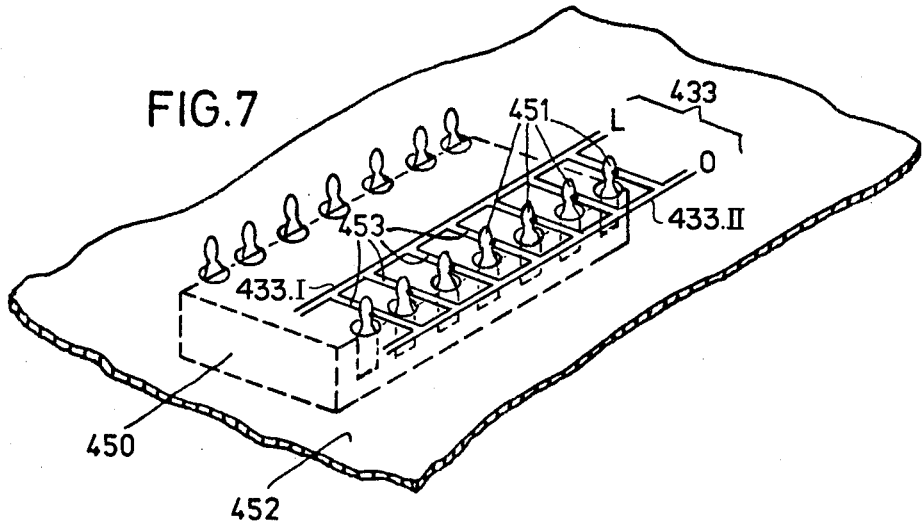
FIG. 7 is a perspective, schematic view of the circuit structure for selective connection, in which the circuit structure is an integrated circuit.

FIG. 7 illustrates a structural arrangement in which the complete circuit of the receiver 111 (FIG. 1) is constructed as an integrated circuit. More than the receiver 111 can be included in the integrated circuit, for example wave-shaping and other circuitry in connection with the reply signal generator, and other circuit elements, but at least the portion of the receiver 111 shown in FIG. 1 can be constructed as a single integrated circuit (IC) within a single IC housing 450. The control signal inputs 432 of the gates 430 with the IC housing 450 are carried out as adjacently positioned IC terminals 451 (FIG. 7), physically pushed through suitable openings in a printed circuit board 452 on which the respective buses 433.I and 433.II are applied as printed circuit paths or printed circuit lines. Short-circuit bridges 453 are connected between the buses 433.I and 433.II in the plane of the printed circuit board 452 and adjacent the IC terminal pins 451. The IC terminals 451 are electrically connected to the respective bridges 453. To program such a receiver - IC housing assembly, it is only necessary to remove a portion or the entire part of the bridges 453 in accordance with binary coding, by breaking the connection of the bridges 453 at the one side, or at the other, of the respective IC terminal 451 to the bus 433.I or 433.II, selectively. The interruption can be, for example, by a cut, a punch-out, or the like. This can be carried out by semi-skilled or newly trained personnel in any shop or garage, based on a suitable programming instruction, with complete electrical reliability. If desired, both bridge portions can be broken. Thus, storage and stocking of receivers 111 for a remote control system of this type will be limited to storing of unprogrammed receivers, as illustrated in FIG. 7, including no more than a printed circuit board 452 with the respective IC in its housing 450 secured thereto. Programming can be done, for example, even by unskilled personnel by placing an overlay on the board 452, and removing a connection bridge portion, or the entire connection bridge, where the overlay indicates openings.

In certain situations, as described in more detail below, some binary digits of the binary coded receiver counter 130 need not be interrogated at all. This is particularly applicable to lower valued digital positions. For such programming, the corresponding IC terminals 451 are severed from both the bus lines 433 by interrupting the bridges 453 at both sides of the IC connecting pins 451. Consequently, the control signal input 433 will be blank or unconnected. Internally, the IC will operate with a voltage as determined by the voltage supplied by the tap point 443 from voltage divider 444 (FIGS. 4, 5) for continuous control of the output of the IC with a 1-signal. The IC terminals of FIG. 7, and shown unconnected, can be suitably connected to the power supply bus 113 or the 433.I bus, as desired (and not shown in the figure for clarity).

Embodiment of FIG. 8: The difference in the receiver circuit between the embodiment of FIG. 1 and that of FIG. 8 is the interposition of a distributing counter 454 between the decoding circuit 131 and the coincidence gate 135. The clock input 455 thereof is serially connected to the output of the AND-gate 431. Thus, the distributing counter 454 will step by one count each time when the coincidence conditions at the input to AND-gate 431 are satisfied. The distributing counter 454, preferably, is a shift register, or any other suitable type of stepping counter, the count outputs of which are connected to separate sub-loads 422A over the coincidence gate 135 and, if desired, over a noise suppression circuit formed by a counter 313. The sub-loads 422 correspond to the loads 122 (FIG. 1); thus, any receiver 111 can have a group of various sub-loads 422A connected thereto, which may also be sub-receivers.

Operation: The distributing counter 454 will count by one step each time the coincidence conditions at the input of the AND-gate are satisfied, and thereby effect connection of the next subsequently connected sub-load at the respective sub-output terminal 311A. The programming of the receiver 111 determines the rhythm during any one selection cycle according to which the clock input 455 of the distributing counter is enabled. Thus, the selection of the switching positions I, II, III between the AND-gate 431 and the receiver counter 130, as determined by the gates 430, will control the stepping of the counter 454.

For example, the coding of the switching 430 can be so arranged that coincidence conditions for gate 431 occur only once during any one selection cycle. Then, for each selection cycle, only one sub-load will be energized, a subsequent sub-load being energized during the next selection cycle. Let it be assumed that the binary counter 130 of the receiver is a four-stage binary counter and, correspondingly, the distributing counter 454 is a four-stage counter, then four sub-loads 422A can be controlled to respond during any one selection cycle, one right after the other. The truth table of the system, FIG. 9, is shown at the left of the diagram. Let it be assumed that the switching positions are as indicated in FIG. 8, that is, the respective connections are as indicated immediately beneath the count output terminals of counter 130 and have the sequence III-III-II-I, which can be obtained by respective severance of the conductive bridges 453 (FIGS. 6, 7) to the voltage control buses of bus system 433. The two least significant positions of the receiver counter 130 are then not interrogated at all. The associated inputs of the AND-gate 431 will have a continuous 1-signal applied thereto. The remaining two gates 430 are coded to have their control inputs connected to the 0-signal bus and the 1-signal bus respectively, the other inputs being connected to the output circuit 132 of the associated count outputs of counter 130. Consequently, AND-gate 431 will be conductive any one selection cycle once at the eighth to the eleventh clock pulse, as is clearly apparent from consideration of the truth table of FIG. 8. The distributing counter 454 thus will count once through its entire four stages, and the four individually connected subloads 422, connected to the output stage 456 of counter 454 are immediately sequentially controlled to be energized.

The sub-loads 422A can also be controlled in a different manner. For example, it may be desired that the control of the sub-loads is so arranged that the response of the sub-loads is distributed as uniformly as possible throughout the duration of any one selection cycle if the respective receiver 111 is once enabled, or commanded to respond. If this decoding program is desired then the coding should be carried out as indicated by the Roman numerals immediately above the block 131 of FIG. 8, the result then being given in the line below the break line of the truth table. The decoding circuit 131 will then be connected to the sequence I-II-III-III (FIG. 8). As is clearly apparent from the lowest line of the truth table, the coincidence conditions of the AND-gate 431 will then occur at the first, fifth, ninth and thirteenth counter pulse, derived from bus 129 and applied to the respective coincidence gates 135 connected to the output from the output stage 456 of the distributing counter 454. Consequently, the respective sub-loads will be energized to respond not immediately sequentially but, rather, in a response pattern distributed throughout the pulses of any one selection cycle assumed to provide for fifteen pulses, the next selection cycle then being separated from the preceding one by a function synchronization signal.

Coding of the receiver to provide for connection of sub-loads distributed throughout a selection cycle is particularly suitable if the load is not a conventional power-consuming load but, rather, is a sensor which provides digital measuring values, to be transmitted back through the central station from the reply signal generator 149 over the reply bus 145, specifically as described in published German Disclosure Document DT-OS No. 2,513,323, see specifically FIGS. 2 and 3. If so used, the distributing counter 454 carries out the function of a ring counter in the load which is connected therein to interrogate the binary digital values of the measured or sensed parameter, to provide a digital binary coded output signal representative of the sensed parameter. The reply signal generator 149 then can be used to interrogate sequential binary significant positions at the output of a quantitizing circuit in the respective sensing unit forming the load, and converting a sensed parameter to binary digital form. In the aforementioned disclosure document, the ring counter is referred to under reference numeral 180, and the interrogation circuit includes a logic system having an AND-gate 179, an OR-gate 181—the function of both of which is taken over by AND-gate 146 and the reply signal generator 149 in the embodiment of FIG. 8, so that the reply signal generator will provide for interrogation of the respective binary digital position at the output of the quantitizing unit 173 (DT-OS No. 2,513,323), thus simplifying on overall system e.g. shown in FIG. 5 of U.S. Ser. No. 836,979, too.

Various changes and modifications may be made, and features described in connection with any one embodiment may be used with any one of the others, within the scope of the inventive concept.

We claim:

1. Remote control system for selection of at least one switchable load (122) from a central station (110) connected together by a ring bus system (106), wherein the bus system (106) includes a power bus, (114), a clock bus (117) and a control bus (129);

wherein the central station includes a clock source (112), load address means (123) to select connection of a selected load (122) to the power bus (114) and counter means (115) providing control signals corresponding to selected count states of the counter, in accordance with the addressing provided by the load addressing means, and synchronized with clock pulses from the clock source; and wherein at least one of the loads includes a load control receiver (111) and a decoding stage (130, 131, 135, 431') forming part of the load control receiver (111) and being connected to both said clock bus (117) and said control bus (129) of the ring bus system (106) to decode address command signals appearing on the control bus (129) in synchronism with clock pulses appearing on the clock bus (117), and wherein, in accordance with the invention the decoding stage includes a binary counter (130), polarized power supply means (433) having two polarity terminals (433.I,L; 433.II,O), a plurality of control gates (430) having transfer switch characteristics, each having one input connected to a selected binary output of the binary counter (130) and another input connected to a selected polarity terminal (L,O) of said polarized power supply means (433), said control gates providing an output (I, II) depending on the selected polarity of the power source connected to the other input thereof, as a function of the output from the counter, and an AND-function gate (431, 431') having its input connected to and controlled by the output of the control gates (131; 430) and receiving signals from said control gates characteristic of the output from the counter in either direct, or inverted form as determined by the selected connection of the control gates to said source of polarized power supply (433).

2. System according to claim 1, wherein the control gates (430) comprise EXCLUSIVE-OR gate (430) having an inverting output, one input of said gates being connected to respective binary outputs of the counter and second input of said gates being connected, selectively, to either polarity terminal of said polarized power supply means (433), said other input forming a control input (432) for said gates.

3. System according to claim 1, wherein said gates have a control input (432), the control input being connected to the internal circuitry of the gates through a direct connection for one switching state and through an inverter stage (439) for another switching connection.

4. System according to claim 3, wherein (FIG. 3) the control gates (430) comprise two interconnected electrically controllable switches (436.I, 436.II) having their inputs connected to the respective outputs of the binary counter (130) directly, or inverted;

an OR-gate (437) receiving the outputs of the switches (436.I, 436.II);

a control signal input (432) for each of said gates, and an inverter (440) connecting the control signal input (432) to one of said switches (436.I), and a direct connection connecting said input (432) to the other of said switches (436.II).

5. System according to claim 4, wherein (FIG. 4) the switches (436) comprise the emitter-collector paths of two transistors, the bases of which are connected, respectively, to the control input (432) through the inverter (440) and directly, respectively.

6. System according to claim 4, wherein (FIG. 5) the switches comprise transmission gates (445) having complementary push-pull connected gate electrodes (A, Ā), respective gate electrodes of said transmission gates being, respectively, connected to the control input (432) through said inverter (440) and, respectively, directly.

7. System according to claim 6, wherein the control input (432) is connected to: the inverter (440), the direct connected gate-electrode of one transmission gate, and the inverting connected gate electrode of the other transmission gate, the output of the inverter being connected to the inverting gate electrode of the first transmission gate and to the direct controlling gate electrode of the other transmission gate.

8. System according to claim 1, wherein (FIGS. 4, 5) the control gates have three switching positions, two of said switching positions being controlled by the respective polarity of the power supply, and the third switching position being independent of, and disconnected from said power supply means (433).

9. System according to claim 8, further including a voltage divider (444) in at least some of the control gates (430), the voltage divider (444) having a tap (443), the tap being connected to said other input and forming a control input (432) of the respective control gates, said tap providing approximately half the voltage of the voltage difference between said two polarity terminals (L,O) of said power supply means (433) to provide said approximately half - operating voltage at the control terminal (432) when said control terminal is not connected to either terminal of said polarized power supply means (433).

10. System according to claim 7, further including a voltage divider (444) in at least some of the control gates (430), the voltage divider (444) having a tap (443), the tap being connected to said other input and forming a control input (432) of the respective control gates, said tap providing approximately half the voltage of the voltage difference between said two polarity terminasl (L,O) of said power supply means (443) to provide said approximately half - operating voltage at the control terminal (432) when said control terminal is not connected to either terminal of said polarized power supply means (433);
   and further including an additional inverter stage (448) and an inhibit gate (446),
   the inverter (440) having its output connected to a source of potential; the control input (432) being connected over the additional inverter stage (448) and the inhibit gate (446) to the output (438) of the control gate (430), the negating input of the inhibit gate (446) being connected to the output of the first inverter (440), the output of the second inverter stage being connected over a resistor (447) to the other terminal of said source and to the direct input of the inhibit gate (446).

11. System according to claim 1, wherein the polarized power supply means (433) includes a pair of supply buses (433.I; 433.II), each connected to a respective terminal of the polarized power supply;
   the other input of said control gates forming control terminals, said control terminals being originally connected each one to both of said supply buses but disconnectable from one of them.

12. System according to claim 11, wherein said control gates comprise at least part of an integrated circuit (IC);
   and wherein the control terminals (432) are brought out as adjacent connection pins (451) of said integrated circuit.

13. System according to claim 12, wherein the polarized buses (433.I; 433.II) are parallel conductive paths; and including
   severable cross bridges (453) connecting said parallel conductive paths, said connecting pins (451) of the integrated circuit being located adjacent to and connected to said severable cross bridges (453) to permit selective severance of the cross bridges between the pins (451) and said buses (433.I, 433.II).

14. System according to claim 13, wherein said bridges form conductive paths of a printed circuit board, said integrated circuit including said gates being secured to said printed circuit board.

15. System according to claim 13, wherein said integrated circuit further includes the binary receiver counter (130) and said AND-function gate (431).

16. System according to claim 1, further including an additional coincidence input (435) connected to the AND-function gate (431') and further connected to the control bus (129) of the ring bus system (106).

17. System according to claim 1, further comprising a distributing counter (454) having its clock or count input (455) connected to the output of the AND-function gate (431);
   a plurality of coincidence gates (135) connected, respectively, to the control bus (129) of the bus system (106) and, each, to different count output stages of said distributing counter (454).
   and a plurality of sub-receivers (422) each, respectively, being connected to an output of the respective coincidence stages (135).

18. System according to claim 17, wherein a group sequence or cycle of clock pulses supplied from the central station (110) to the clock bus (117) collectively forms a selection cycle;
   and wherein, for immediately sequential control of the sub-receivers (422) within any one selection cycle, the lowest significant count output positions (438) of the control gates (430) connected to the respective lowest significant count positions of the receiver counter (130) are controlled to provide a continuous output signal of a predetermined polarity, regardless of the polarity of the output signals of the binary counter (130).

19. System according to claim 17, wherein a group sequence or cycle of clock pulses supplied from the central station (110) to the clock bus (117) collectively forms a selection cycle for approximately uniform distribution of control of the sub-receivers during the course of a selection cycle and wherein for distributed timing control of the sub-receivers (422) within any one selection cycle, the most significant count output positions (438) of the control gates (430) connected to the respective most significant count positions of the receiver counter (130) are controlled to provide a continuous output signal of a predetermined polarity, regardless of the polarity of the output signals of the binary counter (130).

20. Binary signal controlled counter decoding system, to selectively provide outputs of a predetermined signal characteristic in dependence on the count state of a counter and a binary control signal, comprising
   a pair of connecting lines (433.I, 433.II) having placed thereon a polarized electrical potential to provide on one of the buses (433.I) a 1-signal, and on the other of the buses (433.II) a 0-signal;
   a plurality of control gates (131, 430) having transfer switch characteristics, and having a control input terminal (432),
   the gaates (131, 430) each having an input connected to respective binary output terminals of said binary counter (130) and said control input, selectively, connected to at least either, or neither, of the polarized power supply lines, said control gates providing an output (I, II) depending on the selected polarity connection of the control input (432) as a function of the output signal received from the counter;
   and an AND-function gate (431, 431') having its input connected to, and controlled by, the outputs of the control gates (430) and receiving signals from said control gates characteristic of the output from the counter in either direct or inverted form, as determined by the selective connection of the control gates to said polarized supply lines whereby selective connection of selected control terminals of said gates will determine the coincidence conditions under which said AND-function gate provides an output.

21. System according to claim 20, further comprising means (443, 444) in at least some of said gates and controlling said at least some gates to provide an output of a predetermined characteristic if the control input terminal (432) of the respective control gate is not connected to either of the polarized lines (433.I, 433.II).

22. System according to claim 21, wherein said control means (443, 444) include a voltage source of lesser level than the voltage difference between said lines representing the binary signals, and of such magnitude that said binary signals will override control by said voltage source if the control terminal (432) is connected to either one of said binary signal lines (433.I, 433.II).

23. In an automotive remote control system,
the system as claimed in claim 1
to provide for externally, mechanically programmable output control of the counter (130) by selective interruption of the connection of the other input (432) of said gates (430) with at least one of a respective one of said binary signal connecting lines (433.I, 433.II).

* * * * *